US012551277B2

(12) United States Patent
Duan

(10) Patent No.: US 12,551,277 B2
(45) Date of Patent: Feb. 17, 2026

(54) HAIR-REMOVAL APPARATUS

(71) Applicant: Shenzhen Yangwo Electronic Co., Ltd, Shenzhen (CN)

(72) Inventor: Dejin Duan, Shenzhen (CN)

(73) Assignee: SHENZHEN YANGWO ELECTRONIC CO., LTD, Shenzhen (CN)

( * ) Notice: Subject to any disclaimer, the term of this patent is extended or adjusted under 35 U.S.C. 154(b) by 488 days.

(21) Appl. No.: 17/933,125

(22) Filed: Sep. 19, 2022

(65) Prior Publication Data

US 2024/0041521 A1 Feb. 8, 2024

(51) Int. Cl.
*A61B 18/20* (2006.01)
*A61B 18/00* (2006.01)

(52) U.S. Cl.
CPC .. *A61B 18/203* (2013.01); *A61B 2018/00005* (2013.01); *A61B 2018/00101* (2013.01); *A61B 2018/00476* (2013.01); *A61B 2018/00815* (2013.01); *A61B 2018/0094* (2013.01); *A61B 2018/2023* (2017.05); *A61B 2018/20553* (2017.05)

(58) Field of Classification Search
CPC ... A61B 18/203; A61N 5/0616; A61N 5/0617
See application file for complete search history.

(56) References Cited

U.S. PATENT DOCUMENTS

| 8,226,696 B1 * | 7/2012 | Christiansen | A61B 18/203 607/90 |
| 2002/0005475 A1 * | 1/2002 | Zenzie | A61B 18/203 250/221 |

FOREIGN PATENT DOCUMENTS

| CN | 205484748 U | 8/2016 |
| CN | 205698921 U | 11/2016 |
| CN | 208493013 U | 2/2019 |
| CN | 110974397 A | 4/2020 |
| CN | 211273204 U | 8/2020 |
| KR | 2020220000508 U | 3/2022 |

* cited by examiner

*Primary Examiner* — Lynsey C Eiseman
(74) *Attorney, Agent, or Firm* — Andrew C. Cheng

(57) ABSTRACT

The present disclosure relates generally to a hair-removal apparatus, which includes a main body and a light-filtering member, with at least one sensing element disposed thereon, detachably connected to the main body. When the light-filtering member is connected to the main body, the main body recognizes the sensing element. The light-filtering member is detachably connected to the main body, so that users can easily replace the light-filtering members of different wavelengths by simply inserting and pulling, which solves the problem that functions of the existing household hair-removal devices cannot be easily switched. In addition, the sensing element is disposed on the light-filtering member, which is easy to set different combinations of the sensing elements according to multiple functions, and can mass-produce the light-filtering member to reduce the cost of production.

17 Claims, 8 Drawing Sheets

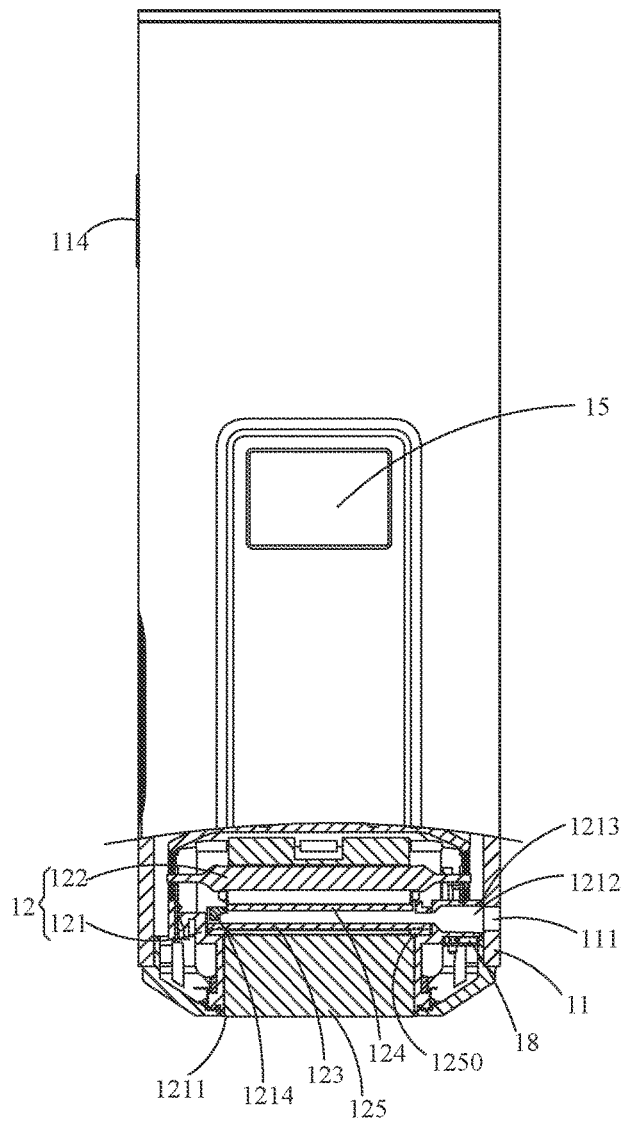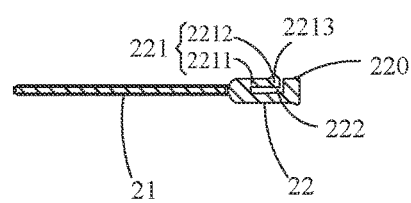
FIG. 4
FIG. 5

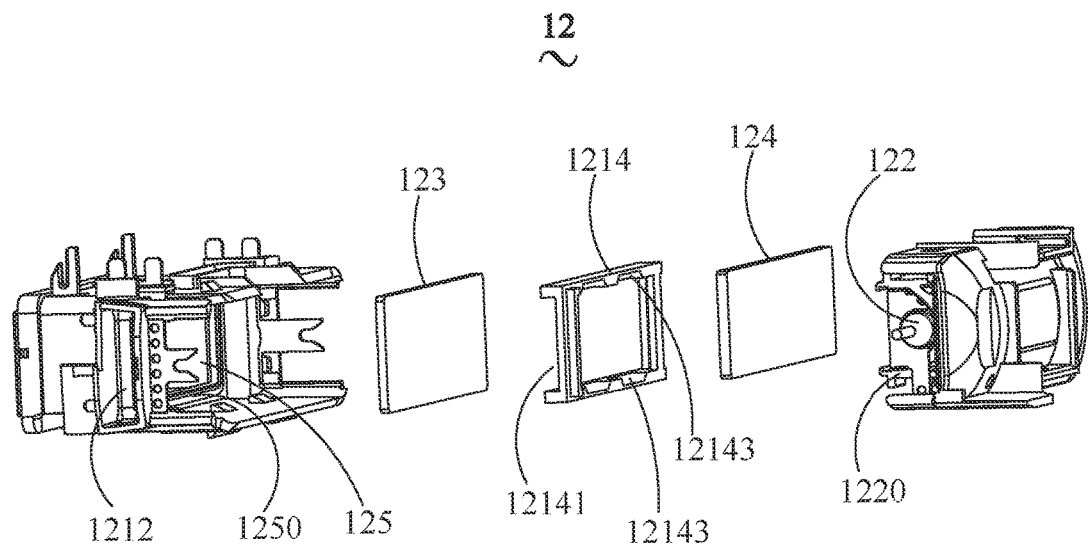
FIG. 6
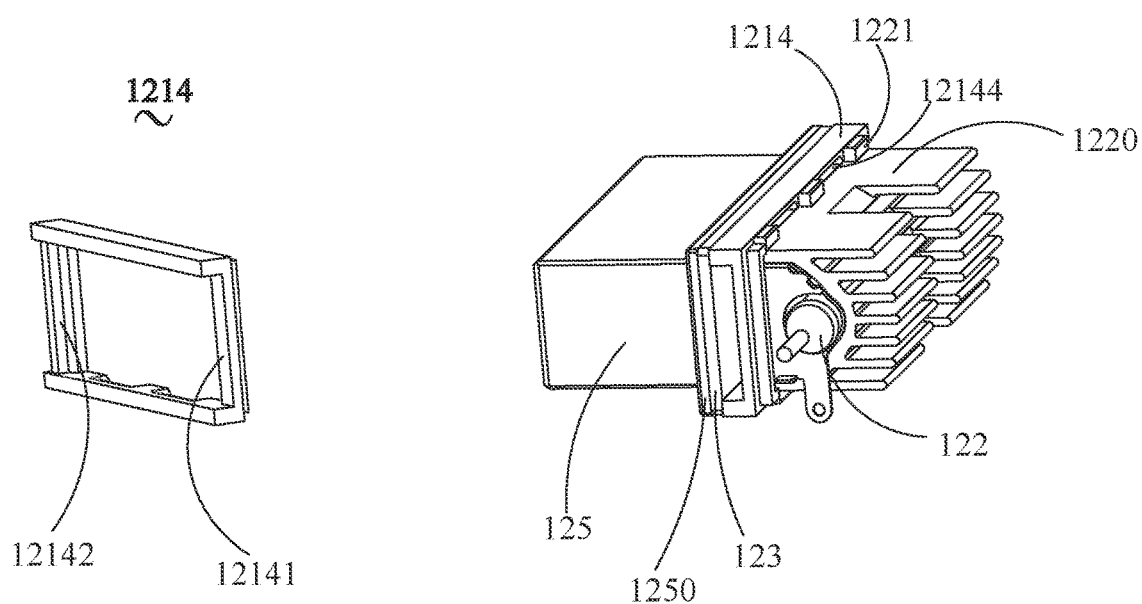
FIG. 7
FIG. 8

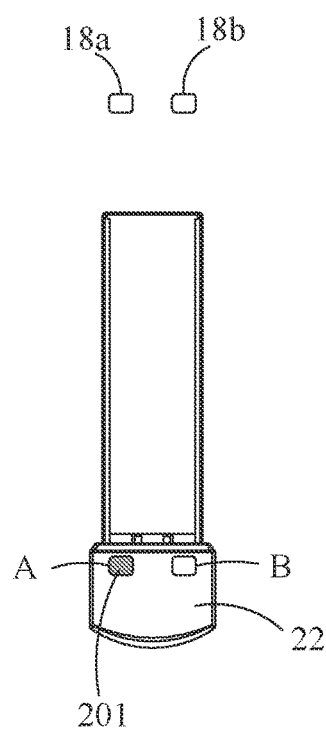
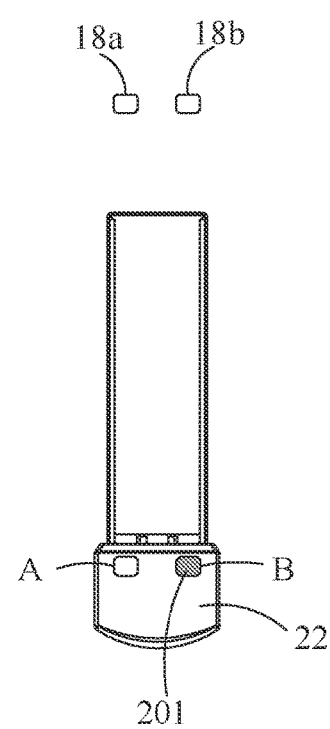
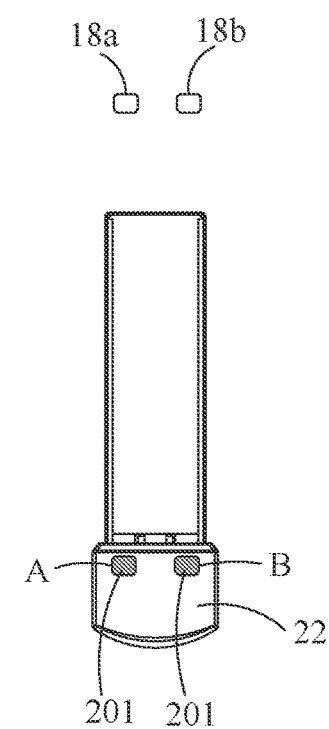
FIG. 11
FIG. 12
FIG. 13

HAIR-REMOVAL APPARATUS

TECHNICAL FIELD

The present disclosure relates generally to the technical field of hair-removal devices, and more particularly to a hair-removal apparatus.

BACKGROUND

The principle of optical beauty is to irradiate the skin with different wavelengths of light to achieve hair removal, whitening, acne removal and other effects. In practical applications, filters are usually used to select different wavelengths of light.

Most of the existing household hair removal devices have a single filter built into the device, which only provides the function of hair removal, or are equipped with multiple functional lamp heads (such as hair-removal lamp heads, whitening lamp heads, acne-removal lamp heads, etc.) for disassembly and switching. However, these two methods are either difficult to switch functions, or troublesome to disassemble and assemble when switching, and the cost of multiple lamp heads is high and difficult to carry. Neither of these two methods can meet users' demands for convenient function switching.

SUMMARY

In order to solve the problem that the existing household hair removal devices cannot conveniently switch functions, the present disclosure provides a hair-removal apparatus.

In order to solve the technical problems, the present disclosure provides a hair-removal apparatus, which includes a main body and a light-filtering member detachably connected to the main body; at least one sensing element is disposed on the light-filtering member; when the light-filtering member is connected to the main body, the main body recognizes the sensing element to determine the type of the light-filtering member and whether the light-filtering member is inserted in the proper position where it is configured to be inserted.

Preferably, the main body includes a light-emitting mechanism that includes a body, a light-transmitting crystal and a lamp mounted in the body; a light-exit opening is defined on the body; one end of the light-transmitting crystal is exposed out of the light-exit opening for contacting user's skin, and the other end thereof is close to the lamp; light emitted by the lamp passes through the light-transmitting crystal and emits from the light-exit opening.

Preferably, the light-filtering member is inserted into the body from the narrow side of the main body and is located between the light-transmitting crystal and the lamp.

Preferably, the main body is further provided with at least one Hall element, and the sensing element is a magnetic member; a mounting side-hole is further defined on the body; the light-filtering member is detachably disposed in the main body through the mounting side-hole, and the Hall element is aligned with the sensing element.

Preferably, the light-filtering member includes a light-filtering portion and a handle portion, and the sensing element is disposed on the handle portion; when the light-filtering member is inserted into the body, the position of the light-filtering portion corresponds to that of the light-exit opening; one end of the handle portion away from the light-filtering portion is exposed out of the main body.

Preferably, a flange is formed at one end of the handle portion exposed out of the main body, and the protruding direction of the flange is perpendicular to the insertion direction of the light-filtering member; a fixing member is further provided on the handle portion, and a groove is defined in the mounting side-hole corresponding to the fixing member; after the light-filtering member is inserted into the body, the fixing member is clamped into the groove.

Preferably, the light-filtering portion includes a light-filtering sheet and a frame; the frame is connected to the handle portion, and the light-filtering sheet is disposed in the frame; an interspace is defined between the light-filtering sheet and the handle portion; at least one protrusion is provided at one end of the handle portion close to the interspace, and the protrusion abuts against the light-filtering sheet.

Preferably, the light-emitting mechanism further includes a front glass sheet, which is disposed in the body and separates the light-transmitting crystal from the lamp; after the light-filtering member is inserted into the body, the light-filtering portion is located on one side of the front glass sheet close to the lamp, and the light-filtering portion is parallel to the front glass sheet.

Preferably, a hollow separating member is disposed in the main body, which seals the region between the light-transmitting crystal and the front glass sheet.

Preferably, the light-emitting mechanism further includes a hollow partition plate disposed on one side of the front glass sheet close to the lamp; one end of the partition plate corresponding to the mounting side-hole defines an opening, and the other end thereof away from the opening defines a step; during insertion of the light-filtering member into the body, the light-filtering portion is inserted through the opening and eventually abuts against the step.

Preferably, the light-emitting mechanism further includes a rear glass sheet disposed on one side of the partition plate close to the lamp; the front glass sheet, the partition plate and the rear glass sheet together form a space for accommodating the light-filtering portion.

Preferably, the main body is provided with two Hall elements; the handle portion defines a first position and a second position corresponding to the Hall elements; the sensing element is disposed at the first position, or the second position, or both the first position and the second position.

Preferably, the handle portion is provided with an anti-reverse insertion structure, and the shape of the mounting side-hole matches that of the handle portion.

Preferably, the main body further includes a power switch and a light-emitting button; after the light-filtering member is inserted into the body, the power switch can be turned on, and then the light-emitting button can control the lamp to work normally; if the light-filtering member is not inserted into the body, the lamp will not work; a resilient member is further disposed in the body, which is in contact with the light-filtering member for ejecting the light-filtering member from the body.

Preferably, the main body includes an external circuit board, a key PCBA (the PCBAs mentioned in this article are all abbreviations for Printed Circuit Board Assembly) and a main-control PCBA, and the key PCBA and the light-emitting mechanism are respectively arranged on two sides of the main-control PCBA; a gap is defined between the main-control PCBA and the body; the external circuit board includes a connecting section and a conducting section that are electrically connected; at least part of the conducting section is positioned in the gap, and the connecting section is electrically connected to the key PCBA.

Preferably, the external circuit board is entirely or partially made of a flexible circuit board material; the main body further includes a thermosensitive assembly, which penetrates through the light-emitting mechanism and closely disposed on the light-transmitting crystal; the conducting section is closely disposed to the body so that the conducting section is connected to the thermosensitive assembly.

Preferably, the connecting section is bent toward the main-control PCBA and defines a first notch, and part of electronic components on the main-control PCBA are accommodated in the first notch; the conducting section is bent toward the light-transmitting crystal and defines a second notch, and the light-transmitting crystal wrapped by the body is clamped in the second notch; the body defines a refrigerating-sheet assembling hole and a temperature-measuring hole; the main body further comprises a refrigerating assembly in contact with the light-transmitting crystal through the refrigerating-sheet assembling hole to refrigerate the light-transmitting crystal; one end of the thermosensitive assembly penetrates into the temperature-measuring hole and is in contact with the light-transmitting crystal.

Preferably, a second thermistor is provided on the key PCBA, and the main body further includes a heat-dissipating mechanism; the second thermistor penetrates into the heat-dissipating mechanism to detect the temperature inside the heat-dissipating mechanism.

Preferably, the external circuit board further includes a fixing section electrically connected to the conducting section; the Hall element is disposed on and electrically connected to the fixing section; the fixing section is parallel to the insertion direction of the light-filtering member.

Preferably, the light-emitting mechanism further includes a pressing plate covered on the conducting section, and a portion of the pressing plate covering the conducting section is positioned in the gap.

Compared with the prior art, the hair-removal apparatus of the present disclosure has the following beneficial effects.

The hair-removal apparatus of the present disclosure includes a main body and a light-filtering member detachably connected to the main body; at least one sensing element is disposed on the light-filtering member; when the light-filtering member is connected to the main body, the main body recognizes the sensing element to determine the type of the light-filtering member and whether the light-filtering member is inserted in place. The light-filtering member is detachably connected to the main body, so that when requiring different functions, users can simply insert and pull to replace the light-filtering members of different wavelengths, and the problem that the existing household hair-removal devices cannot conveniently switch functions can be solved. In addition, the method of disposing the sensing element on the light-filtering member makes the sensing element in different combinations for the design of multiple functions easier to realize, which can mass-produce the light-filtering member and reduce the cost of production.

The main body of the present disclosure includes a light-emitting mechanism that includes a body, a light-transmitting crystal and a lamp mounted in the body; a light-exit opening is defined on the body; one end of the light-transmitting crystal is exposed out of the light-exit opening for contacting user's skin, and the other end thereof is close to the lamp; light emitted by the lamp passes through the light-transmitting crystal and emits from the light-exit opening; the light-filtering member is inserted into the body from the narrow side of the main body and is located between the light-transmitting crystal and the lamp By disposing the light-transmitting crystal that can be in contact with the skin for icing, the burning sensation on the skin caused by the light emitted by the lamp can be reduced.

The light-transmitting crystal of the present disclosure is exposed out of the light-exit opening for contacting the skin; the light-filtering member cannot be configured to be inserted from the light-exit opening (that is, from the head of the hair-removal apparatus). The light-filtering member is inserted from the narrow side of the main body, which takes into account the direct contact of the light-transmitting crystal with the skin and the replacement of the light-filtering member, so that the inserting holes defined on the surface of the main body can be made smaller in size and external objects can be prevented from entering into the hair-removal apparatus accidentally; after the light-filtering member is inserted, the exposed part of the light-filtering member is smaller, which can make the overall design of the present disclosure aesthetic and improve user experience.

The main body of the present disclosure is further provided with at least one Hall element; the sensing element is a magnetic member; the main body further defines a mounting side-hole; the light-filtering member is detachably disposed in the main body through the mounting side-hole, and the Hall element is aligned with the sensing element. By defining the mounting side-holes, the space between the lamp and the light-transmitting crystal can be communicated with the outer side of the main body, and the light-filtering member can be easily inserted into and out of the space by simply inserting and pulling, so that the light-filtering members of different wavelengths can be easily replaced, which solves the problem that the existing household hair-removal devices cannot conveniently switch functions. In addition, the hair-removal apparatus cannot be started normally when the light-filtering member is not inserted or not inserted in place. That is, the on-off of the light-emitting mechanism can be controlled by the Hall element that accurately senses whether the light-filtering member is inserted in place, which prevents unfiltered strong light from hurting users. In addition, the Hall element can also obtain the number and corresponding position information of the sensing element to accurately identify the type of the light-filtering member inserted into the main body, so as to control the light-emitting mechanism to adapt to different functions to output light with corresponding energy value, and achieve the optimal effect of the corresponding function.

The light-filtering member of the present disclosure includes a light-filtering portion and a handle portion, and the sensing element is disposed on the handle portion; when the light-filtering member is inserted into the body, the position of the light-filtering portion corresponds to that of the light-exit opening, and one end of the handle portion away from the light-filtering portion is exposed from the main body. By providing the handle portion, the user only needs to touch the handle portion when replacing the light-filtering member, which prevents user's hands from being in contact with and contaminating the light-filtering portion to cause the filtering effect to deteriorate.

In the present disclosure, a flange is formed at one end of the handle portion exposed from the main body, and the protruding direction of the flange is perpendicular to the insertion direction of the light-filtering member. By arranging the flange, when the light-filtering member is pulled out, user's fingers can have a force point, which prevents the hand from slipping and enhances the practicality thereof.

In the present disclosure, a fixing member is further provided on the handle portion, and a groove is defined in the mounting side-hole corresponding to the fixing member; after the light-filtering member is inserted into the body, the fixing element is clamped into the groove. By arranging the fixing member and the groove corresponding to the fixing member, the light-filtering member can be limited and fixed after the light-filtering member is inserted into the body, which prevents the light-filtering member from shaking or even sliding down by itself to affect user experience.

In the present disclosure, the light-filtering portion includes a light-filtering sheet and a frame; the frame is connected to the handle portion, and the light-filtering sheet is disposed in the frame. By disposing the frame, it is convenient to install and fix the light-filtering sheet; in addition, when the light-filtering member is inserted and removed, the wear of the light-filtering sheet can be effectively avoided, and the lifetime thereof can be increased; the frame is made of metal of heat-resistant and decomposition-resistant properties, which can ensure that the frame can better protect the light-filtering sheet.

In the present disclosure, an interspace is defined between the light-filtering sheet and the handle portion; at least one protrusion is provided at one end of the handle portion close to the interspace, and the protrusion abuts against the light-filtering sheet. Thus, the interspace can be used to dissipate heat, and the protrusion can be used to support and fix the light-filtering sheet, so that the use effect is better and the practicability is further enhanced.

In the present disclosure, the handle portion and at least a portion of the frame are wrapped with an adhesive layer to avoid high-voltage leakage and hurt people, ensure safe use, and further play a heat-insulation effect, so that the user will not feel burning when touching the handle portion, which improves user experience.

In the present disclosure, the light-emitting mechanism further includes a front glass sheet, which is disposed in the body and separates the light-transmitting crystal and the lamp; after the light-filtering member is inserted into the main body, the light-filtering portion is located on the side of the front glass sheet close to the lamp, and the light-filtering portion is parallel to the front glass sheet. By arranging the front glass sheet, dust that affects the normal light-emitting of the lamp can be prevented from entering from the light-exit opening. In addition, the front glass sheet can be a filter specially designed to filter pure harmful light such as ultraviolet rays to add safety protection for user's skin.

In the present disclosure, a hollow separating member is disposed in the main body, and the separating member seals the region between the light-transmitting crystal and the front glass sheet. It can be understood that the light-transmitting crystal and the front glass sheet are fully abut on two sides of the separating member respectively, so that a vacuum is always maintained between the light-transmitting crystal and the front glass sheet, that is, the separating member seals the region between the light-transmitting crystal and the front glass sheet to prevent gas liquefaction and fogging on the sides facing oppositely of the front glass sheet and/or the transparent crystal, which further improves the light-emitting quality. In addition, hot air is easily liquefied into water droplets when cold, and the water droplets may cause safety problems when being in contact with the circuit board of the hair-removal apparatus. By disposing the separating member to seal the region between the light-transmitting crystal and the front glass sheet, the use safety of the hair-removal apparatus is improved.

In the present disclosure, the light-emitting mechanism further includes a hollow partition plate disposed on the side of the front glass sheet close to the lamp; one end of the partition plate corresponding to the mounting side-hole defines an opening, and the other end of the partition plate away from the opening defines a step; during insertion of the light-filtering member into the body, the light-filtering portion enters through the opening and finally abuts the step. By disposing the partition plate, the light-filtering portion can be accurately introduced and the position thereof can be limited, and the stability of the light-filtering member after installation can be enhanced.

In the present disclosure, the light-emitting mechanism further includes a rear glass sheet disposed on the side of the partition plate close to the lamp; the front glass sheet, the partition plate and the rear glass sheet together form a space for accommodating the light-filtering portion. By disposing the rear glass sheet, dust can be prevented from entering the mounting side-hole and affecting the normal light-emitting of the lamp.

In the present disclosure, the light-emitting mechanism further includes a reflective cup, and the lamp is arranged in the reflective cup; at least one notch is further defined on the partition plate, and the reflective cup abuts against the partition plate and defines a ventilation hole with the notch. By defining the ventilation hole, the interior of the light-emitting mechanism can further absorb external air and dissipate heat, which further ensures that the hair-removal apparatus runs at a favorable ambiance temperature.

In the present disclosure, the handle portion has an anti-reverse insertion structure; at least one set of opposite sides of the handle portion is asymmetrically arranged, and the shape of the mounting side hole matches that of the handle portion. Thus, the light-filtering member can be prevented from being inserted backward, which affects the recognition of the sensing element by the Hall element thus affecting the normal start of the hair-removal apparatus and user experience.

In the present disclosure, the main body further includes a power switch and a light-emitting button; after the light-filtering member is inserted into the main body, the hair-removal apparatus can be turned on by long-press the power switch, then the lamp can be controlled to work normally by pressing the light-emitting button; if the light-filtering member is not inserted into the main body, the power switch will not be turned on, and the lamp will not work. Thus, it can be ensured that the lamp can be turned on normally only when the light-filtering member is inserted into the main body, that is, the lamp tube can be turned on to emit light, which can prevent unfiltered strong light from hurting user's skin and ensure safety.

In the present disclosure, a resilient member is further disposed in the body, and the resilient member is in contact with the light-filtering member for ejecting the light-filtering member from the body. By arranging the resilient member, the light-filtering member can be more conveniently taken out and replaced by means of pressing and rebounding, which improves user experience.

In the present disclosure, the main body further includes an external circuit board, a key PCBA, and a main-control PCBA; the key PCBA and the light-emitting mechanism are respectively arranged on two sides of the main-control PCBA; a gap is defined between the main-control PCBA and the body of the light-emitting mechanism; the external circuit board includes a connecting section and a conducting section that are electrically connected, at least part of the conducting section is positioned in the gap, and the connecting section is electrically connected to the key PCBA. It can be understood that part of electronic components is required to be configured far away from the key PCBA and the main-control PCBA to achieve functions thereof, however, if connected by cables, the connected circuit will have no stable load, resulting in poor safety and stability of the circuit. The external circuit board has an integrated circuit, which can be stably loaded by the external circuit board, and the problems of poor safety and stability of the internal circuit of the existing household hair-removal devices are solved. In addition, the external circuit board can be transformed into a corresponding shape according to the space where it is disposed, which can fully utilize the space and adapt to the development of miniaturization.

In the present disclosure, the main body further includes a thermosensitive assembly, and the thermosensitive assembly penetrates through the light-emitting mechanism and is closely attached to the light-transmitting crystal; the conducting section is in close contact with the body to connect the thermosensitive assembly; the temperature of the light-transmitting crystal is sensed through the thermosensitive assembly, and the temperature thereof is converted into an electrical signal and transmitted to the control unit, so that the light-transmitting crystal can be controlled at a suitable temperature, that is, the temperature of the light-transmitting crystal in contact with the skin is a suitable temperature to improve user experience.

In the present disclosure, the connecting section is bent toward the main-control PCBA and defines a first notch, and part of electronic elements on the main-control PCBA are accommodated in the first notch; the conducting section is bent toward the light-transmitting crystal and defines a second notch, and the body wraps the light-transmitting crystal and then clamped into the second notch. By arranging the first notch and the second notch, an avoidance space can be formed, which facilitates a reasonable and compact arrangement of electronic elements and provides space for other devices, makes full use of the space, and makes the structure of the present disclosure more reasonable.

In the present disclosure, the key PCBA is provided with a second thermistor; the main body further includes a heat-dissipating mechanism, and the second thermistor penetrates into the heat-dissipating mechanism to detect the temperature inside the heat-dissipating mechanism. By disposing the second thermistor, when sensing that the temperature is too high and exceeds the preset threshold, the automatic shutdown control program will be executed to ensure that the hair-removal apparatus can run within a safe temperature.

In the present disclosure, the external circuit board further includes a fixing section electrically connected to the conducting section; the Hall element is disposed on the fixing section, and the Hall element is electrically connected to the fixing section; the fixing section is parallel to the insertion direction of the light-filtering member. By disposing the Hall element at the fixing section, the load function of the external circuit board can be fully utilized, and the safety and stability of the circuit that the Hall element is connected to can be ensured. In addition, the fixing section is parallel to the insertion direction of the light-filtering member, so that the Hall element and the sensing element can be aligned more reasonably and the identification is more accurate.

In the present disclosure, the external circuit board may entirely use a flexible circuit board material; or part of the external circuit board may use a flexible circuit board material, and the remaining part may use a hard board material. When entirely using a flexible circuit board material, the external circuit board can adaptively change its shape according to the size of the space where it is located and the shape of the component it is close to, so as to make reasonable use of the space; when partially using a flexible circuit board material, the turning portions of the external circuit board can be configured as a flexible circuit board material, which can also make reasonable use of the space and enhance the practicability thereof.

In the present disclosure, the body further defines a refrigerating-sheet assembling hole and a temperature-measuring hole; the main body further includes a refrigerating assembly, which is in contact with the light-transmitting crystal through the refrigerating-sheet assembling hole to refrigerate the light-transmitting crystal; one end of the thermosensitive assembly penetrates through the temperature-measuring hole to contact the light-transmitting crystal. By disposing the refrigerating-sheet assembling hole and the temperature-measuring hole, it can be ensured that the light-transmitting crystal is firmly in the body and in contact with the refrigerating assembly and thermosensitive assembly, so that the light-emitting mechanism has strong integrity and compact arrangement.

In the present disclosure, the light-emitting mechanism further includes a pressing plate covered on the conducting section; the portion of the pressing plate covering the conducting section is positioned in the gap, and the shape of the pressing plate is matched with that of part of the surface of the body, so that the conducting section is close to the surface of the body to improve compactness and enhance the stability of the external circuit board. The pressing plate is partially positioned in the gap, which can further save space. In addition, the pressing plate is made of moisture-proof foamed cotton, which can protect the conducting section from moisture.

BRIEF DESCRIPTION OF THE DRAWINGS

In order to illustrate the technical solutions in the embodiments of the present disclosure more clearly, the accompanying drawings will be briefly described below. Obviously, the drawings in the following description are only some embodiments of the present disclosure; for those of ordinary skill in the art, other drawings can also be obtained from these drawings without creative effort.

FIG. 4 is a first partial cross-sectional view of the hair-removal apparatus of the first embodiment of the present disclosure.

FIG. 5 is a cross-sectional view of a light-filtering member of the hair-removal apparatus of the first embodiment of the present disclosure.

FIG. 6 is an exploded view of a light-emitting mechanism of the hair-removal apparatus of the first embodiment of the present disclosure.

FIG. 7 is a perspective view of a partition plate of the hair-removal apparatus of the first embodiment of the present disclosure.

FIG. 8 is a schematic view of an assembly inside the body of the hair-removal apparatus of the first embodiment of the present disclosure.

FIG. 11 is a first example of the light-filtering member coupled with the Hall element of the hair-removal apparatus of the first embodiment of the present disclosure.

FIG. 12 is a second example of the light-filtering member coupled with the Hall element of the hair-removal apparatus of the first embodiment of the present disclosure.

FIG. 13 is a third example of the light-filtering member coupled with the Hall element of the hair-removal apparatus of the first embodiment of the present disclosure.

NUMERICAL REFERENCE IDENTIFICATION

Figure 1:
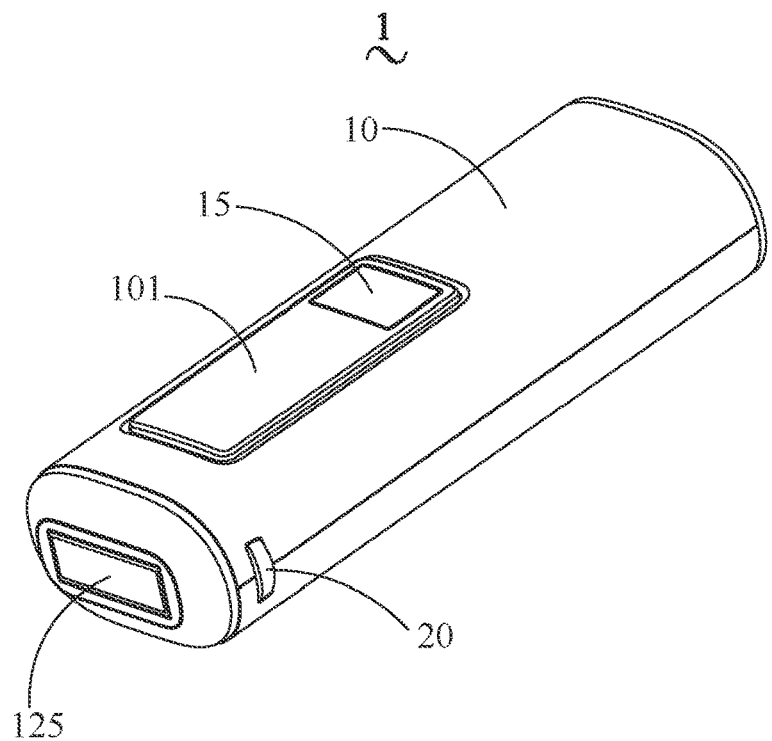
FIG. 1 is a perspective view of a hair-removal apparatus of a first embodiment of the present disclosure.
Figure 2:
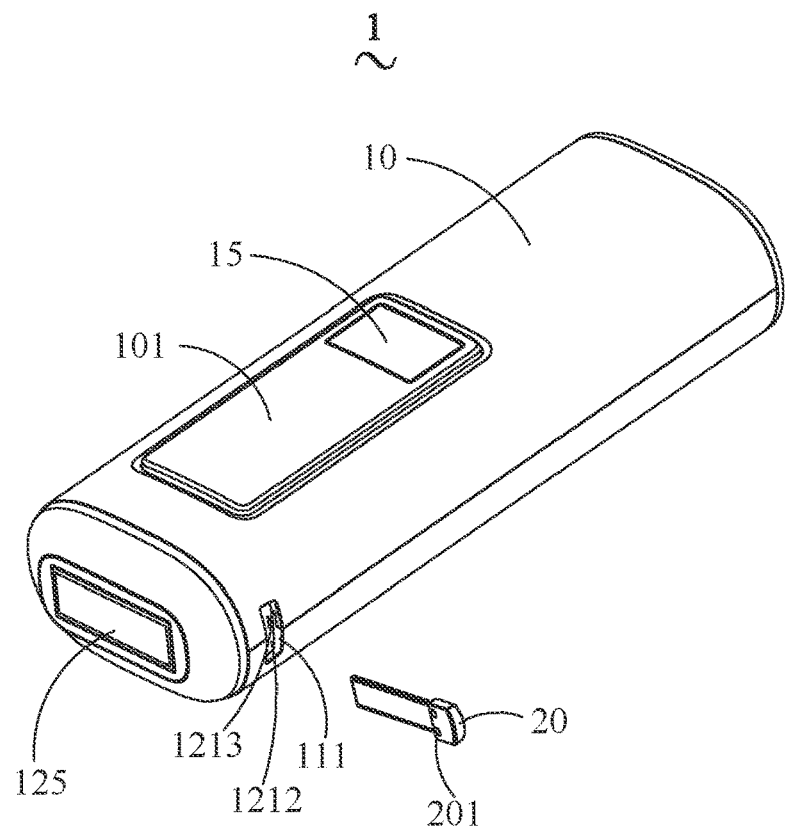
FIG. 2 is a first exploded view of the hair-removal apparatus of the first embodiment of the present disclosure.

1, hair-removal apparatus;
10, main body; 20, light-filtering member; 11, housing; 12, light-emitting mechanism; 13, heat-dissipating mechanism; 14, capacitor; 15, light-emitting button; 16, key PCBA; 17, main-control PCBA; 18, Hall element; 18*a*, Hall element; 18*b*, Hall element; 19, refrigerating assembly; 21, light-filtering portion; 22, handle portion;
101, display screen; 111, inserting hole; 112, upper housing; 113, lower housing; 114, power switch; 121, body; 122, lamp; 123, front glass sheet; 124, rear glass sheet; 125, light-transmitting crystal; 126, pressing plate; 131, air-guiding structure; 161, external circuit board; 162, second thermistor; 171, electronic element; 172, gap; 173, assembling hole; 191, refrigerating sheet; 192, heat-conducting substrate; 193, heat-conducting pipe; 194, heat-dissipating sheet; 195, thermosensitive assembly; 196, first thermistor; 197, heat-conducting silicone grease; 201, sensing element; 211, light-filtering sheet; 212, frame; 213, interspace; 220, flange; 221, fixing member; 222, avoidance slot; 223, protrusion; 1211, light-exit opening; 1212, mounting side-hole; 1213, groove; 1214, partition plate; 1215, refrigerating-sheet assembling hole; 1216, temperature-measuring hole; 1220, reflective cup; 1221, abutting block; 1250, separating member; 1311, penetrating hole; 1611, connecting section; 1612, conducting section; 1613, fixing section; 1614, first notch; 1615, second notch; 2211, fixing end; 2212, swinging end; 2213, convex portion; 12141, opening; 12142, step; 12143, notch; 12144, ventilation hole.

DETAILED DESCRIPTION

In order to make the objectives, technical solutions, and advantages of the present disclosure clearer, the present disclosure is further described in detail below with reference to the accompanying drawings and embodiments. It should be understood that the specific embodiments described herein are provided for illustration only, and not to limit the present disclosure.

It should be noted that when a member is referred to as being "fixed to" another member, it can be directly on the other member or intervening members may also be present. When a member is referred to as being "connected" to another member, it can be directly connected to the other member or intervening members may also be present. The terms "vertical," "horizontal," "left," "right," and similar expressions are used herein for illustrative purposes only.

Referring to FIG. 1 to FIG. 4, a first embodiment of the present disclosure provides a hair-removal apparatus 1, which includes a main body 10 and a light-filtering member 20 detachably connected to the main body 10. The main body 10 includes a housing 11, a light-emitting mechanism 12, a heat-dissipating mechanism 13, a capacitor 14, a power switch 114 and a light-emitting button 15. The light-emitting mechanism 12, the heat-dissipating mechanism 13 and the capacitor 14 are accommodated in an accommodating space formed by the housing 11. The power switch 114 and the light-emitting button 15 are exposed from the housing 11 and are electrically connected to the light-emitting mechanism 12, and an external power supply supplies power to the light-emitting mechanism 12 through the capacitor 14.

Further, at least one sensing element 201 is disposed on the light-filtering element 20. After the light-filtering element 20 is connected to the main body 10, the sensing element 201 is recognized by the main body 10 to confirm that the light-filtering element 20 has been inserted, and then the power switch 114 can be turned on to start the hair-removal apparatus 1 normally. The light-emitting mechanism 12, which emits light that acts on the skin, can be controlled by the light-emitting button 15, and the heat-dissipating mechanism 13 is used to absorb external air and dissipate heat from the light-emitting mechanism 12.

It can be understood that the main body 10 is provided with a sensing device matching the sensing element 201. For example, when the sensing device in the main body 10 is a Hall sensing device, the sensing element 201 is a magnetic member; when the sensing device in the main body 10 is a photoelectric device, the sensing element 201 can be a reflective member, a light-absorbing member or a light-shielding member; when the sensing device in the main body 10 is a micro-motion sensing device, the sensing element 201 can be a triggering member for controlling the on-off of the micro-motion sensing device.

Further, the main body 10 includes a key PCBA 16 and a main-control PCBA 17 that are electrically connected. The light-emitting mechanism 12, the heat-dissipating mechanism 13 and the capacitor 14 are sequentially connected to one side of the main-control PCBA 17 to form a stable entirety, and the key PCBA 16 is disposed on the other side of the main-control PCBA 17, which makes the interior of the main body 10 form a modular arrangement of a stable and compact structure. It can be understood that the power switch 114 and the light-emitting button 15 are electrically connected to the light-emitting mechanism 12 through the key PCBA 16.

It can be understood that a control circuit and a control unit are arranged on the key PCBA 16, and the power switch 114 and the key PCBA 16 are used to centrally control the on-off of each electrical component of the present disclosure.

Further, the main body 10 is provided with a display screen 101, which can display information such as functions, gears, temperature, power, duration and indicator lights thereof, etc., and can display one or more of them, which is not limited here.

Referring to FIG. 1 to FIG. 5, further, the light-emitting mechanism 12 includes a body 121, a light-transmitting crystal 125 and a lamp 122 installed in the body 121. A light-exit opening 1211 is defined on the body 121 and exposed from one end of the light-transmitting crystal 125 to contact the skin, and the other end thereof is close to the lamp 122. Light emitted by the lamp 122 passes through the light-transmitting crystal 125 and emits from the light-exit opening 1211. The light-filtering member 20 enters the body 121 from the narrow side of the main body 10 and is located between the light-transmitting crystal 125 and the lamp 122.

It can be understood that the light-transmitting crystal 125 can be in contact with the skin to ice the skin, which can reduce the burning sensation on the skin caused by the light emitted by the lamp 122. The light-transmitting crystal 125 includes, but is not limited to, any one of sapphire crystal, quartz glass, and K9 glass.

It can be understood that the main body 10 and the light-exit opening 1211 have four adjacent sides, two sides thereof facing oppositely being narrow sides and two sides thereof facing oppositely being wide sides. The light-filtering member 20 is inserted from the narrow side of the main body 10, so that the inserting holes defined on the surface of the main body 10 can be made smaller in size and external objects can be prevented from entering the hair-removal apparatus 1 accidentally. After the light-filtering member 20 is inserted, the exposed part of the light-filtering member 20 is smaller, which can make the overall design of the present disclosure aesthetic and improve user experience.

A mounting side-hole 1212 is further defined on the body 121, and an inserting hole 111 is correspondingly defined on the housing 11. The light-filtering member 20 located between the light-exit opening 1211 and the lamp 122 is detachably disposed in the body 121 through the inserting hole 111 and the mounting side-hole 1212 in sequence. By arranging the inserting hole 111 and the mounting side-hole 1212, the space between the lamp 122 and the light-exit opening 1211 can be communicated with the outer side of the main body 10, and the light-filtering member 20 can easily enter and exit the space by simply inserting and pulling, so that the light-filtering members 20 with different wavelengths can be replaced conveniently, and the problem that the functions of the existing household hair-removal devices cannot be conveniently switched can be solved.

It can be understood that, as an embodiment, the housing 11 includes an upper housing 112 and a lower housing 113. Optionally, the upper housing 112 and the lower housing 113 can be assembled by bolting or clamping, or the upper housing 112 and the lower housing 113 are integrally formed. Specifically, in the embodiment of the present disclosure, the upper housing 112 and the lower housing 113 are assembled by means of buckle-clamping, which facilitates the disassembly and maintenance of the hair-removal apparatus 1 of the present disclosure. In this case, the inserting hole 111 may be formed by the engagement of the upper housing 112 and the lower housing 113.

Further, as an embodiment, the sensing element 201 is a magnetic member, and at least one Hall element 18 is further disposed in the main body 10. After the light-filtering member 20 is inserted into the body 121, the Hall element 18 is aligned with the sensing element 201.

It can be understood that the Hall element 18 is preset with a magnetic field strength threshold value in advance. During the process of inserting the light-filtering member 20 into the body 121, the sensing element 201 gradually approaches and is eventually aligned with the Hall element 18. During this process, the intensity of the magnetic field sensed by the Hall element 18 gradually increases until the sensing element 201 is completely aligned with the Hall element 18, that is, when the light-filtering member 20 is inserted in place, the magnetic field intensity sensed by the Hall element 18 reaches the preset threshold. In this case, the Hall element 18 sends a signal to the control unit that it can be turned on, that is, the control circuit is in the on state at the Hall element 18. In this state, the control unit receives the switch signal of the power switch 114 to start the hair-removal apparatus 1, and then the light-emitting button 15 can be clicked to control the lamp 122 to emit light. When the light-filtering member 20 is not inserted into the body 121, the Hall element 18 cannot sense the magnetic field strength, the power switch 114 does not work, and the light-emitting button 15 cannot control the lamp 122 to work.

It can be understood that the number of the Hall elements 18 and the number of the sensing elements 201 can be equal or unequal, but it should be ensured that when the light-filtering member 20 is inserted into the body 121, at least one sensing element 201 corresponds to the Hall element 18 to ensure the hair-removal apparatus 1 of the present disclosure can be used normally.

It can be understood that the specific position of the sensing element 201 on the light-filtering member 20 may not be limited, as long as the filtering effect of the light-filtering member 20 is not affected. In this case, the Hall element 18 is disposed according to the position of the sensing element 201, which is specifically: if and only if the light-filtering member 20 is inserted into the body 121, the magnetic field strength of the Hall element 18 that receives the corresponding sensing element 201 thereof will reach the preset threshold thereof.

Figure 3:
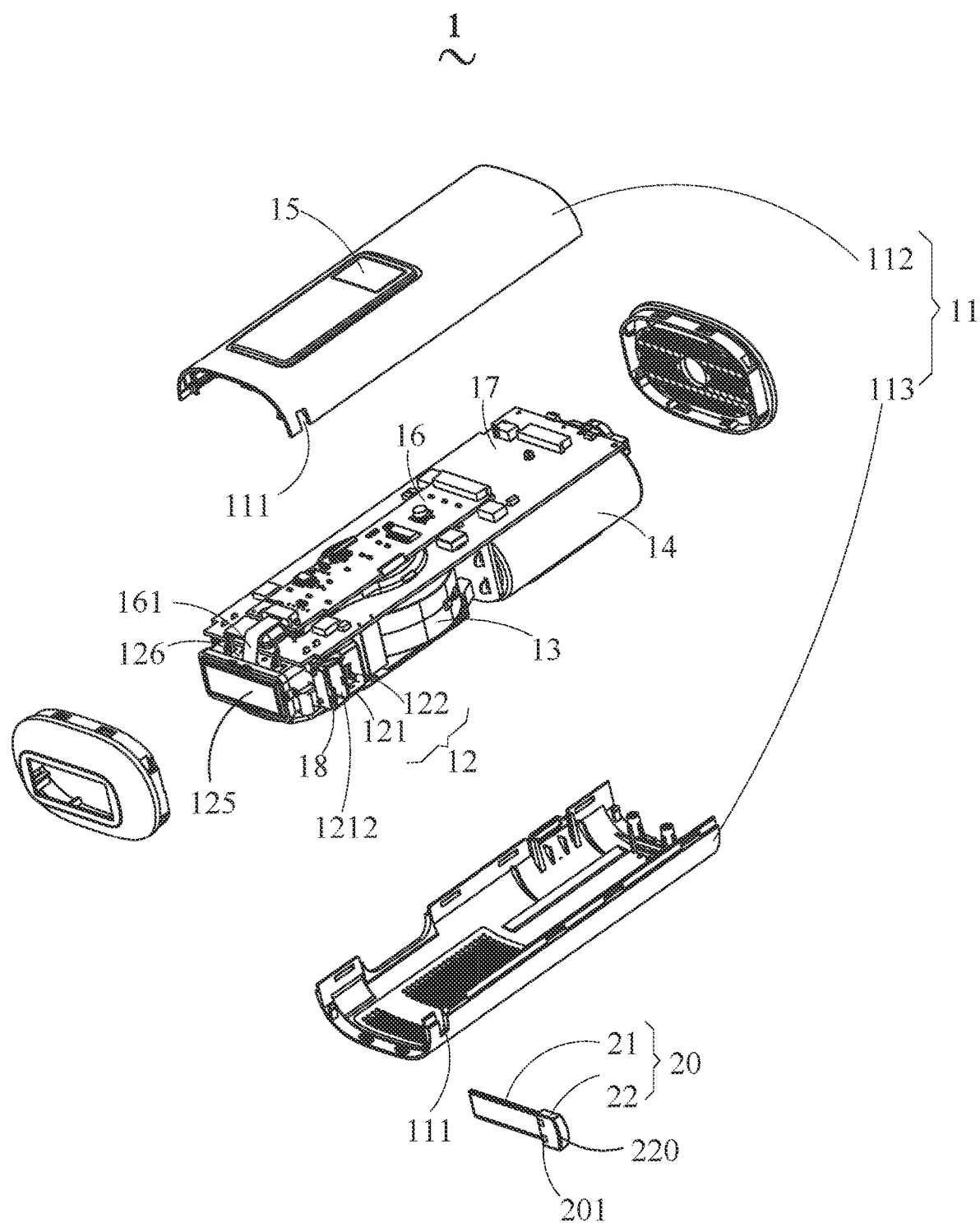
FIG. 3 is a second exploded view of the hair-removal apparatus of the first embodiment of the present disclosure.

Referring to FIG. 3 to FIG. 5, further, as an embodiment, the light-filtering member 20 includes a light-filtering portion 21 and a handle portion 22, and the sensing element 201 is disposed on the handle portion 22. When the light-filtering member 20 is inserted into the body 121, the position of the light-filtering portion 21 corresponds to that of the light-exit opening 1211, and one end of the handle portion 22 away from the light-filtering portion 21 is exposed from the main body 10, that is, one end of the handle portion 22 away from the light-filtering portion 21 is exposed from the main body 10 through the inserting hole 111. Thus, the user only needs to touch the handle portion 22 when replacing the light-filtering member 20, which prevents user's hands from being in contact with and contaminating the light-filtering portion 21 to cause the filtering effect to deteriorate.

Optionally, the sensing element 201 can be hidden and disposed in the handle portion 22 by means of encapsulation, plastic sealing, etc.; or, an accommodating groove can be defined on the handle portion 22 for disposing the sensing element 201, so that the sensing element 201 can be embedded in the handle portion 22, which ensures that the sensing element 201 does not affect the insertion and removal of the light-filtering member 20, and ensures the stability of the position of the sensing element 201.

Further, a flange 220 is formed at one end of the handle portion 22 exposed out of the main body 10, and the protruding direction of the flange 220 is perpendicular to the insertion direction of the light-filtering member 20. By arranging the flange 220, when the light-filtering member 20 is pulled out, user's fingers can have a force point, which prevents the hand from slipping and enhances the practicality thereof.

A fixing member 221 is further provided on the handle portion 22, and a groove 1213 is defined in the mounting side-hole 1212 corresponding to the fixing member 221. After the light-filtering member 20 is inserted into the body 121, the fixing element 221 is clamped into the groove 1213.

By arranging the fixing member 221 and the groove 1213 corresponding the fixing member 221, the light-filtering member 20 can be limited and fixed after the light-filtering member 20 is inserted into the body 121, which prevents the light-filtering member 20 from shaking or even sliding down by itself to affect user experience.

Optionally, the fixing member 221 may be arranged on the same side or the different side of the sensing element 201, as long as the fixing member 221 does not affect the arrangement of the sensing element 201. Specifically, in the embodiment of the present disclosure, the fixing member 221 is disposed on the different side of the sensing element 201.

An avoidance slot 222 is further defined at the position of the handle portion 22 corresponding to the fixing member 221. The fixing member 221 includes a fixed end 2211 and a swinging end 2212. The fixed end 2211 is connected to the inner wall of the avoidance slot 222, the swinging end 2212 is suspended on the avoidance slot 222, and a convex portion 2213 is provided on the side of the swinging end 2212 away from the avoidance slot 222. In a natural state, the convex portion 2213 protrudes from the handle portion 22, and both sides of the convex portion 2213 in the insertion and removal direction are configured as slope surfaces, so that when the light-filtering member 20 enters and exits the body 121, the swinging end 2212 can be smoothly squeezed into the avoidance slot 222 by the slope surfaces, the phenomenon of jamming will not occur, and the practicability thereof will be enhanced.

A resilient member (not shown) is further disposed in the body 121, and the resilient member is in contact with the light-filtering member 20 for ejecting the light-filtering member 20 from the body 121. By arranging the resilient member, the light-filtering member 20 can be more conveniently taken out and replaced by means of pressing and rebounding, which improves user experience.

Referring to FIG. 4 to FIG. 8, the light-emitting mechanism 12 further includes a front glass sheet 123, which is disposed in the body 121 and separates the light-transmitting crystal 125 and the lamp 122. After the light-filtering member 20 is inserted into the main body 121, the light-filtering portion 21 is located on the side of the front glass sheet 123 close to the lamp 122, and the light-filtering portion 21 is parallel to the front glass sheet 123. By arranging the front glass sheet 123, dust can be prevented from entering from the light-exit opening 1211, which affects the normal light-emitting of the lamp 122. In addition, the front glass sheet 123 can be a filter specially designed to filter pure harmful light such as ultraviolet rays to add safety protection for user's skin.

It can be understood that the front glass sheet 123 is disposed on the side of the light-transmitting crystal 125 close to the lamp 122, and the light emitted by the lamp 122 first passes through the front glass sheet 123 and then through the light-transmitting crystal 125 to reach the skin. When the light-filtering member 20 is inserted into the body 121, the light-filtering portion 21 is also located between the light-transmitting crystal 125 and the lamp 122, and the position of the light-filtering portion 21 corresponds to that of the light-transmitting crystal 125, that is, the light reaching the light-transmitting crystal 125 after filtering is the light of a corresponding efficacy wavelength, such as hair-removal wavelength, whitening wavelength, acne-treatment wavelength, etc.

Further, a hollow separating member 1250 is disposed in the main body 10, and the separating member 1250 seals the region between the light-transmitting crystal 125 and the front glass sheet 123. It can be understood that the light-transmitting crystal 125 and the front glass sheet 123 are fully abut on two sides of the separating member 1250 respectively, so that a vacuum is always maintained between the light-transmitting crystal 125 and the front glass sheet 123, that is, the separating member 1250 seals the region between the light-transmitting crystal 125 and the front glass sheet 123 to prevent gas liquefaction and fogging on the sides facing oppositely of the front glass sheet 123 and/or the transparent crystal 125, which further improves the light-emitting quality. In addition, hot air is easily liquefied into water droplets when cold, and the water droplets may cause safety problems when being in contact with the circuit board of the hair-removal apparatus 1. By disposing the separating member 1250 to seal the region between the light-transmitting crystal 125 and the front glass sheet 123, the use safety of the hair-removal apparatus 1 is improved.

The light-emitting mechanism 12 further includes a hollow partition plate 1214 disposed on the side of the front glass sheet 123 close to the lamp 122. One end of the partition plate 1214 corresponding to the mounting side-hole 1212 defines an opening 12141, and the other end of the partition plate 1214 away from the opening 12141 defines a step 12142. During insertion of the light-filtering member 20 into the body 121, the light-filtering portion 21 enters through the opening 12141 and finally abuts the step 12142. By disposing the partition plate 1214, the light-filtering portion 21 can be accurately introduced and the position thereof can be limited, and the stability of the light-filtering member 20 after installation can be enhanced.

Specifically, the partition plate 1214 is made of Teflon material, which can improve the thermostability thereof.

The light-emitting mechanism 12 further includes a rear glass sheet 124 disposed on the side of the partition plate 1214 close to the lamp 122, and the front glass sheet 123 and the rear glass sheet 124 abut on two sides of the partition plate 1214 respectively. The front glass sheet 123, the partition plate 1214 and the rear glass sheet 124 together form a space for accommodating the light-filtering portion 21. The space is connected to ambiance through the opening 12141 and the mounting side-hole 1212 to prevent dust from entering the mounting side-hole 1212 and affecting the power of the lamp 122.

The light-emitting mechanism 12 further includes a reflective cup 1220, and the lamp 122 is arranged in the reflective cup 1220. At least one notch 12143 is further defined on the partition plate 1214, and the reflective cup 1220 abuts against the partition plate 1214 and defines a ventilation hole 12144 (as shown in FIG. 8) with the notch 12143. By defining the ventilation hole 12144, the interior of the light-emitting mechanism 12 can further absorb external air and dissipate heat.

It can be understood that, in order to better define the ventilation hole 12144, a plurality of abutting blocks 1221 can be provided at the abutting end of the reflective cup 1220 abutting against the partition plate 1214, and the abutting end of the reflective cup 1220 are misaligned with the frame on which the notch 12143 is located. The plurality of abutting blocks 1221 is spaced to be misaligned with the notch 12143, so that the ventilation hole 12144 has a larger effective ventilation section, which can better absorb external air and dissipate heat.

Figure 9:
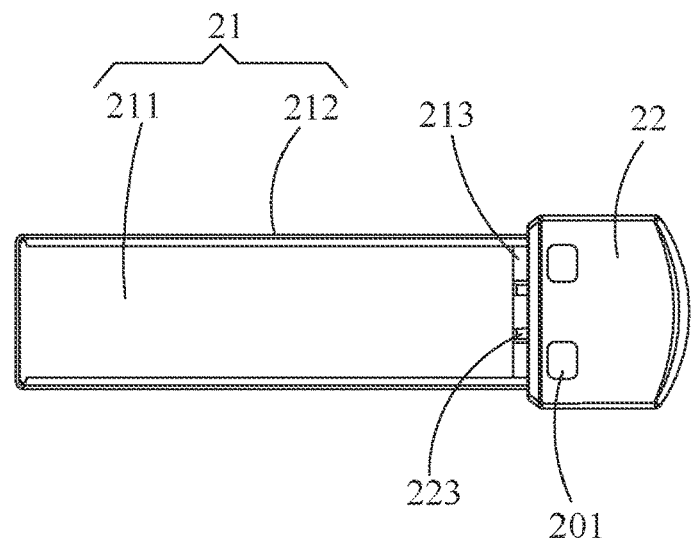
FIG. 9 is a front view of the light-filtering member of the hair-removal apparatus of the first embodiment of the present disclosure.

Referring to FIG. 9, further, the light-filtering portion 21 includes a light-filtering sheet 211 and a frame 212, the frame 212 is connected to the handle portion 22, and the light-filtering sheet 211 is disposed in the frame 212. By disposing the frame 212, it is convenient to install and fix the light-filtering sheet 211; when the light-filtering member 20 is inserted and removed, the wear of the light-filtering sheet 211 can be effectively avoided, and the lifetime thereof can be increased.

Specifically, the material of the frame 212 is a metal, preferably a stainless steel material, and the heat-resistant and decomposition-resistant properties of the metal can ensure that the frame 212 can better protect the light-filtering sheet 211.

Further, an interspace 213 is defined between the light-filtering sheet 211 and the handle portion 22; at least one protrusion 223 is provided at one end of the handle portion 22 close to the interspace 213, and the protrusion 223 abuts against the light-filtering sheet 211. Thus, the interspace 213 can be used to dissipate heat, and the protrusion 223 can be used to support and fix the light-filtering sheet 211, so that the use effect is better and the practicability is further enhanced.

Further, the handle portion 22 and the frame 212 are wrapped with an adhesive layer to avoid high-voltage leakage hurting people, ensure safe use, and further play a heat-insulation effect, so that the user will not feel burning when touching the handle portion 22, which improves user experience. It can be understood that the handle portion 22 and the frame 212 can be covered with an adhesive layer by a secondary injection-molding process to ensure the overall-structure reliability and anti-creeping reliability.

Figure 10:
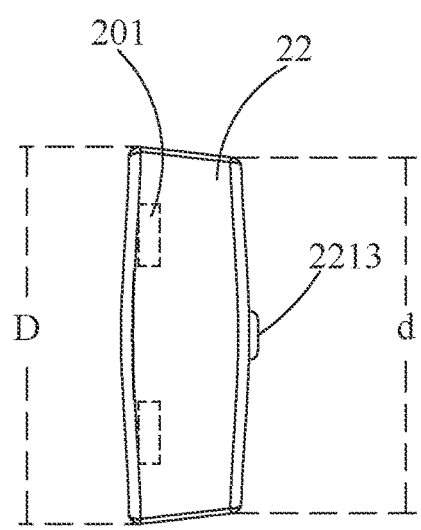
FIG. 10 is a right view of the light-filtering member of the hair-removal apparatus of the first embodiment of the present disclosure.

Referring to FIG. 10, further, the handle portion 22 has an anti-reverse insertion structure. As an embodiment, the anti-reverse insertion structure may be: at least one set of opposite sides of the handle portion 22 is asymmetrically arranged, so that the light-filtering member 20 can only be inserted from one direction, which prevents the reverse insertion from affecting the power-on, the light-filtering function, or strong light that may hurt the user.

Specifically, as a further embodiment, the width of one side of the handle portion 22 on which the sensing element 201 is disposed is different from that of the other side, and the shapes of the inserting hole 111 and the mounting side-hole 1212 match that of the handle portion 22. Optionally, the width of one side of the handle portion 22 on which the sensing element 201 is disposed may be greater than that of the other side; or, the width of one side of the handle portion 22 on which the sensing element 201 is disposed may be smaller than that of the other side. More specifically, in the embodiment of the present disclosure, the width D of one side of the handle portion 22 on which the sensing element 201 is disposed is larger than the width d of the other side (as shown in FIG. 10). Thus, the reverse insertion of the light-filtering member 20, which may cause the Hall element 18 to fail to sense the sensing element 201 normally, can be prevented, so that the hair-removal apparatus 1 of the present disclosure can be used normally and user experience will not be affected.

It can be understood that by arranging a plurality of Hall elements 18, the information of the sensing element 201 can be recognized through different Hall elements 18, and the control system intelligently controls the voltage and current of the circuit according to the different information, so that the lamp 122 can emit light of different intensities to obtain light sources of suitable wavelengths.

Referring to FIG. 11 to FIG. 13, an example of function matching is given in the embodiment of the present disclosure. Two Hall elements 18 are provided in the main body 10, which are respectively a Hall element 18*a* and a Hall element 18*b*, and the handle portion 22 defines a first position A and second position B. When the light-filtering member 20 is inserted into the body 121, the first position A and the second position B correspond to the Hall element 18*a* and the Hall element 18*b* respectively; according to whether the sensing element 201 is provided on the first position A and the second position B, there are three cases: in the first case, the sensing element 201 is disposed at the first position A but not disposed at the second position B; the light-filtering member 20 in this case is set to have a whitening effect; only the Hall element 18*a* that has a preset threshold can sense the magnetic field strength; the Hall element 18*a* then sends a signal to the control system that it can be turned on and light with whitening strength can be emitted (as shown in FIG. 11); in the second case, the sensing element 201 is disposed at the second position B but not disposed at the first position A; the light-filtering member 20 in this case is set to have an acne-treatment effect; only the Hall element 18*b* that has a preset threshold can sense the magnetic field strength; the Hall element 18*b* then sends a signal to the control system that it can be turned on and light with acne-treatment strength can be emitted (as shown in FIG. 12); in the third case, the sensing element 201 is disposed at the first position A and the second position B; the light-filtering member 20 in this case is set to have a hair-removal effect; both the Hall element 18*a* and the Hall element 18*b* that have a preset threshold can sense the magnetic field strength; the Hall element 18*a* and the Hall element 18*b* then send a signal to the control system that they can be turned on and light with hair-removal strength can be emitted (as shown in FIG. 13).

Figure 14:
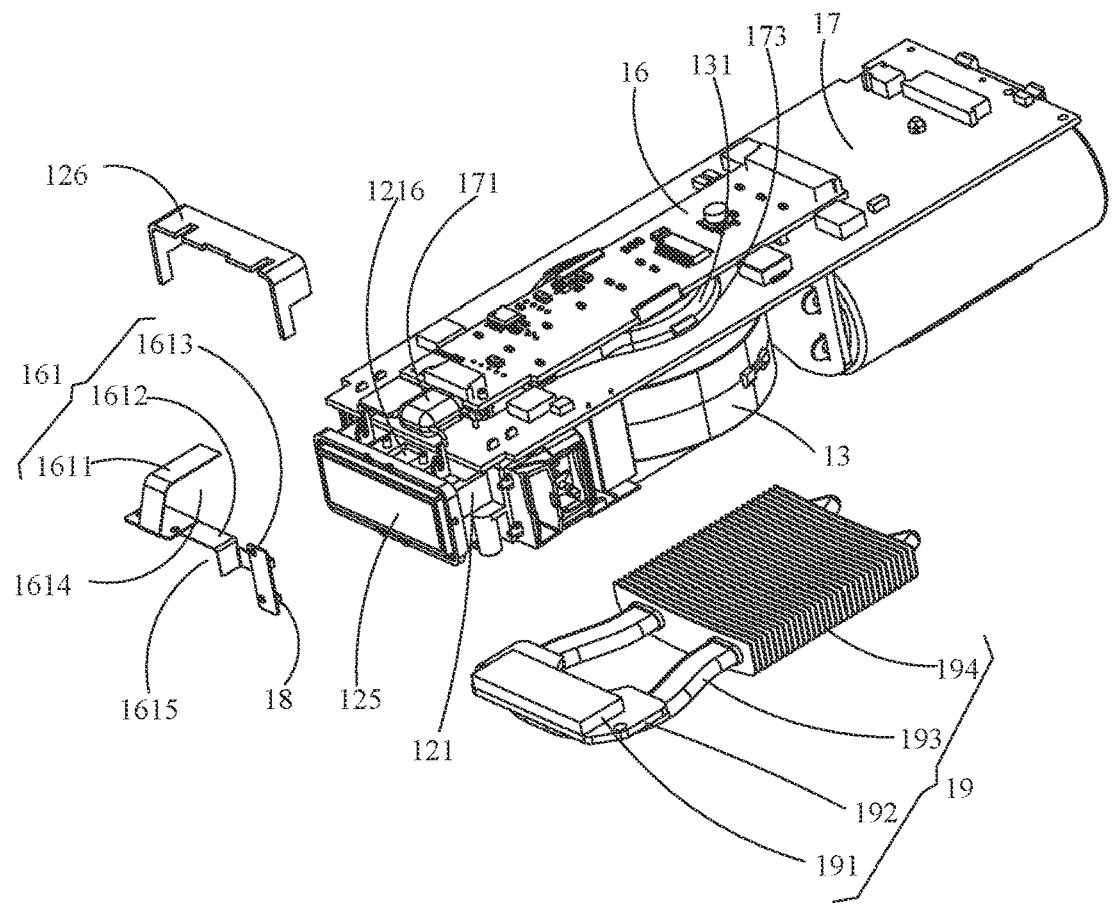
FIG. 14 is an exploded view of partial components of the hair-removal apparatus of the first embodiment of the present disclosure.
Figure 16:
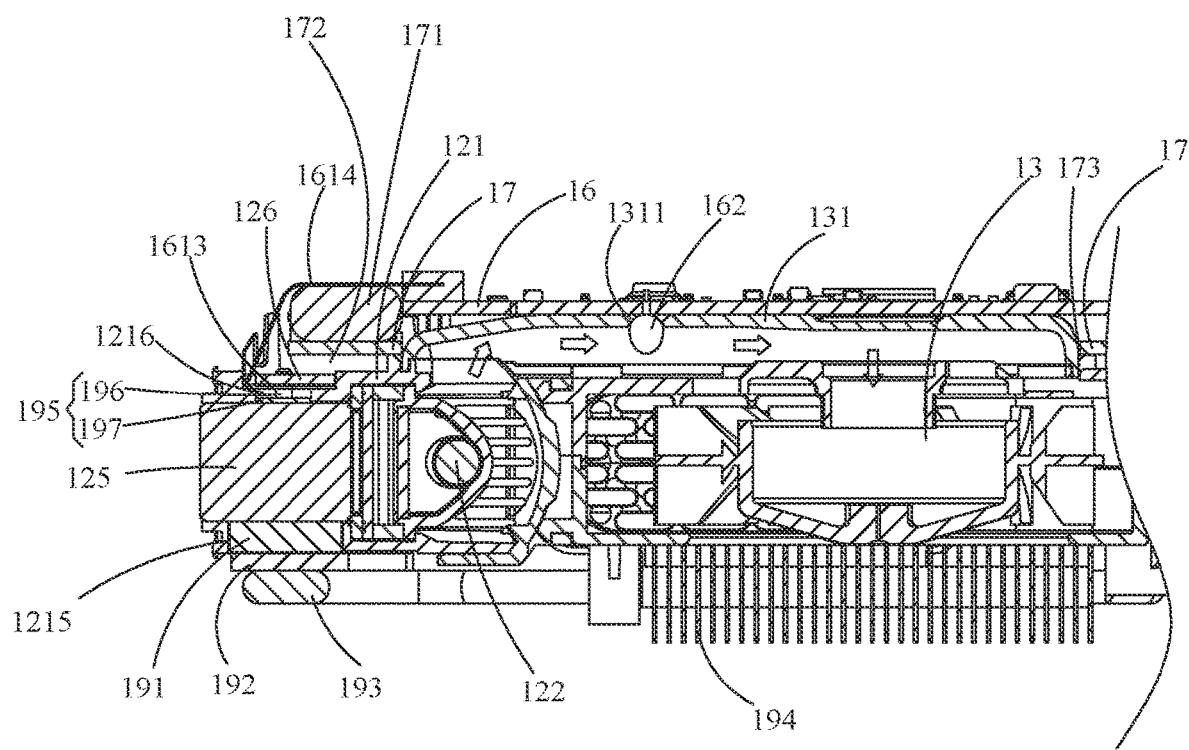
FIG. 16 is a second partial cross-sectional view of the hair-removal apparatus of the first embodiment of the present disclosure.

Referring to FIG. 14 and FIG. 16, further, the body 121 further defines a refrigerating-sheet assembling hole 1215; the main body 10 further includes a refrigerating assembly 19; the refrigerating assembly 19 is in contact with the light-transmitting crystal 125 through the refrigerating-sheet assembling hole 1215 to refrigerate the light-transmitting crystal 125.

The refrigerating assembly 19 includes a refrigerating sheet 191, a heat-conducting substrate 192, a heat-conducting pipe 193 and a heat-dissipating sheet 194. One side (i.e. refrigerating side) of the refrigerating sheet 191 passes through the refrigerating-sheet assembling hole 1215 and contacts the light-transmitting crystal 125, and the other side thereof is connected to the heat-conducting substrate 192, the heat-conducting pipe 193 and the heat-dissipating sheet 194 in sequence. The refrigerating surface of the refrigerating sheet 191 is used for refrigerating the light-transmitting crystal 125, and the heat generated is conducted to the heat-dissipating sheet 194 through the heat-conducting substrate 192 and the heat-conducting pipe 193 in sequence for heat dissipation.

The main body 10 further includes a thermosensitive assembly 195, and the thermosensitive assembly 195 penetrates through the light-emitting mechanism 12 and is closely attached to the light-transmitting crystal 125.

The body 121 further defines a temperature-measuring hole 1216; one end of the thermosensitive assembly 195 penetrates through the temperature-measuring hole 1216 to contact the light-transmitting crystal 125, and the other end thereof is electrically connected to the key PCBA 16 and associated with the refrigerating assembly 19 through the key PCBA 16. That is, the on-off of the refrigerating assembly 19 can be controlled according to the thermosensitive assembly 195.

Further, the thermosensitive assembly 195 includes a first thermistor 196 and a heat-conducting silicone grease 197. One side of the heat-conducting silicone grease 197 is in contact with the light-transmitting crystal 125, and the other side thereof covers the first thermistor 196, which can better sense the temperature change of the light-transmitting crystal 125.

It can be understood that the light-transmitting crystal 125 will be heated up due to the illumination of the lamp 122 and cooled down with the refrigerating of the refrigerating assembly 19. The illumination of the lamp 122 is intermittent, and the interval time is not determined according to the pressure time of the user; meanwhile, it takes time to cool down the refrigerating assembly 19, the two times are difficult to unify, and the efficiency of heating and refrigerating are also different. In order to prevent potential high-temperature injury, it is necessary to turn on the refrigerating assembly 19 for a long time during use; as a result, the temperature may be too low to affect user experience. The first thermistor 196 has a preset resistance value threshold corresponding to a comfortable temperature, and the refrigerating assembly 19 is controlled to stop running when the temperature is too low and start running when the temperature is high, so that the light-transmitting crystal 125 is controlled at a suitable temperature, that is, the temperature when in contact with the skin is suitable.

Optionally, the first thermistor 196 can be a positive temperature coefficient thermistor, and the resistance value thereof increases as the temperature increases. The first thermistor 196 can be connected in parallel with the refrigerating assembly 19 to set a lower resistance value threshold thereof. When the temperature is lower than the critical temperature corresponding to the resistance value threshold, the current of the branch where the refrigerating assembly 19 is located will be so small that the refrigerating assembly 19 cannot be started, and the refrigerating assembly 19 stops working; after the temperature rises, the refrigerating assembly 19 operates again. The set resistance threshold corresponds to an optimum temperature, and the actual temperature fluctuates around the optimum temperature. Or, the first thermistor 196 may be a negative temperature coefficient thermistor, and the resistance value thereof decreases as the temperature increases. The first thermistor 196 can be connected in series with the refrigerating assembly 19 to set a larger resistance value threshold thereof. When the temperature is lower than the critical temperature corresponding to the resistance value threshold, the resistance of the branch where the refrigerating assembly 19 is located will be large enough and the current of the branch where the refrigerating assembly 19 is located will be too small to start the refrigerating assembly 19, and the refrigerating assembly 19 stops working; after the temperature rises, the refrigerating assembly 19 operates again. The set resistance value threshold corresponds to an optimum temperature, and the actual temperature fluctuates around the optimum temperature.

The main body 10 further includes an external circuit board 161, and the Hall element 18 and the first thermistor 196 are connected to the control circuit of the key PCBA 16 through the external circuit board 161.

It can be understood that the first thermistor 196 needs to be close to the light-transmitting crystal 125 to be sensed to realize its function, so the first thermistor 196 needs to be far away from the key PCBA 16. If connected by a cable, the section of the circuit from the first thermistor 196 to the key PCBA 16 will have no stable load, resulting in poor safety and stability of the circuit. Therefore, the external circuit board 161 is provided to connect the first thermistor 196 with the key PCBA 16. The external circuit board 161 has an integrated circuit, which can be stably loaded by the external circuit board 161, and the problems of poor safety and stability of the internal circuit of the existing household hair-removal devices are solved. In addition, the external circuit board 161 can be transformed into a corresponding shape according to the space where it is disposed, which can fully utilize the space and adapt to the development of miniaturization.

Optionally, the external circuit board 161 may entirely use a flexible circuit board material; or part of the external circuit board 161 may use a flexible circuit board material, and the remaining part may use a hard board material. When entirely using a flexible circuit board material, the external circuit board 161 can adaptively change its shape according to the size of the space where it is located and the shape of the component it is close to, so as to make reasonable use of the space. When partially using a flexible circuit board material, the turning portions of the external circuit board 161 can be configured as a flexible circuit board material, which can also make reasonable use of the space and enhance the practicability thereof.

Further, the external circuit board 161 includes a connecting section 1611, a conducting section 1612 and a fixing section 1613 that are electrically connected in sequence. The fixing section 1613 is positioned on the light-emitting mechanism 12; the conducting section 1612 is in close contact with two adjacent sides of the light-emitting mechanism 12 to connect the thermosensitive assembly 195; the connecting section 1611 is electrically connected to the key PCBA 16.

Optionally, the fixing section 1613 may be fixed on the body 121 by means of melt glue or bolt connection or snap connection.

Further, the Hall element 18 is electrically connected to the fixing section 1613, and the fixing section 1613 is parallel to the insertion direction of the light-filtering member 20.

Further, the connecting section 1611 is bent toward the main-control PCBA 17 and defines a first notch 1614, and part of electronic elements 171 on the main-control PCBA 17 are accommodated in the first notch 1614.

Further, the conducting section 1612 is bent toward the light-transmitting crystal 125 and defines a second notch 1615, and the body 121 wraps the light-transmitting crystal 125 and then snaps into the second notch 1615.

Further, a gap 172 is defined between the main-control PCBA 17 and the body 121, and at least part of the conducting section 1612 is disposed in the gap 172.

Figure 15:
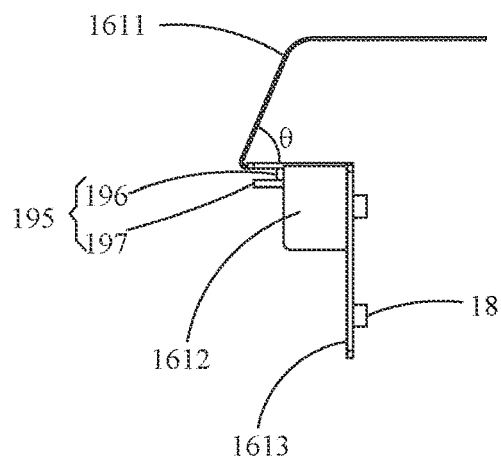
FIG. 15 is a right view of an external circuit board of the hair-removal apparatus of the first embodiment of the present disclosure.

Further, after the connecting section 1611 and the conducting section 1612 are connected, an included angle θ is formed (θ shown in FIG. 15), and the included angle θ is in the range of 45°-90°, preferably 90°, so that the first notch 1614 has a larger accommodating space.

Further, the bending direction of the connecting section 1611 is perpendicular to the bending direction of the conducting section 1612, so that the layers of the first notch 1614 and the second notch 1615 correspond to the layers formed by the main-control PCBA 17 and the light-emitting mechanism 12.

The light-emitting mechanism 12 further includes a pressing plate 126 covered on the conducting section 1612; the portion of the pressing plate 126 covering the conducting section 1612 is placed in the gap 172, and the shape of the pressing plate 126 is matched with that of part of the surface of the body 121, so that the conducting section 1612 is close to the surface of the body 121 to improve compactness and enhance the stability of the external circuit board 161. The pressing plate 126 is partially positioned in the gap 172, which can further save space.

Specifically, the material of the pressing plate 126 is moisture-proof foamed cotton to protect the conducting section 1612 from moisture.

Further, a second thermistor 162 is disposed on the key PCBA 16 and penetrates into the heat-dissipating mechanism 13 to detect the temperature inside the heat-dissipating mechanism 13.

Further, the heat-dissipating mechanism 13 includes an air-guiding structure 131; the main-control PCBA 17 defines an assembling hole 173 corresponding to the air-guiding structure 131; the air-guiding structure 131 defines a penetrating hole 1311 corresponding to the second thermistor 162; the air-guiding structure 131 penetrates through the assembling hole 173 and is in close contact with the key PCBA 16; the second thermistor 162 is inserted into the penetrating hole 1311 to measure the temperature of the airflow in the air-guiding structure 131. It can be understood that if the temperature of the hair-removal apparatus 1 is too high, the internal components will be accelerated aging, the lifetime will be affected, and there will be potential safety hazards. An air duct is formed in the air-guiding structure 131. When the light-emitting mechanism 12 emits light, heat is generated, and the generated heat is mainly dissipated through the air duct. In this case, the temperature threshold can be set. When the second thermistor 162 in the air duct senses that the temperature is too high and exceeded the set threshold, the automatic shutdown control program will be executed to ensure that the hair-removal apparatus 1 can run within a safe temperature.

It can be understood that, in order to prevent air leakage and interference at the penetrating hole 1311, the air-guiding structure 131 is in close contact with the key PCBA 16 around the penetrating hole 1311.

The above descriptions are only preferred embodiments of the present disclosure, and are not intended to limit the present disclosure. Any modifications, equivalent replacements and improvements made within the principles of the present disclosure should be included within the protection scope of the present disclosure.

The invention claimed is:

1. A hair-removal apparatus, comprising: a main body and a light-filtering member detachably connected to the main body; at least one sensing element being disposed on the light-filtering member; when the light-filtering member is connected to the main body, the main body recognizing the sensing element to determine the type of the light-filtering member and whether the light-filtering member is inserted in a proper position;
   the main body comprises a light-emitting mechanism that comprises a body, a light-transmitting crystal and a lamp mounted in the body; a light-exit opening is defined on the body; one end of the light-transmitting crystal is exposed out of the light-exit opening for contacting skin, and the other end thereof is close to the lamp; light emitted by the lamp passes through the light-transmitting crystal and emits from the light-exit opening;
   the light-filtering member comprises a light-filtering portion and a handle portion; and
   the light-emitting mechanism further comprises a front glass sheet, a hollow partition plate and a rear glass sheet; the front glass sheet is disposed in the body and separates the light-transmitting crystal from the lamp, after the light-filtering member is inserted into the body, the light-filtering portion is located on one side of the front glass sheet close to the lamp; the hollow partition plate is disposed on one side of the front glass sheet close to the lamp; the rear glass sheet is disposed on one side of the partition plate close to the lamp; the front glass sheet, the partition plate and the rear glass sheet jointly form a space for accommodating the light-filtering portion.

2. The hair-removal apparatus according to claim 1, wherein the light-filtering member is inserted into the body from a narrow side of the main body and is located between the light-transmitting crystal and the lamp.

3. The hair-removal apparatus according to claim 2, wherein the main body is further provided with at least one Hall element, and the sensing element is a magnetic member; a mounting side-hole is further defined on the body; the light-filtering member is detachably disposed in the main body through the mounting side-hole, and the Hall element is aligned with the sensing element.

4. The hair-removal apparatus according to claim 3, wherein the sensing element is disposed on the handle portion;
   when the light-filtering member is inserted into the body, the position of the light-filtering portion corresponds to that of the light-exit opening; one end of the handle portion away from the light-filtering portion is exposed out of the main body.

5. The hair-removal apparatus according to claim 4, wherein one end of the handle portion exposed out of the main body forms a flange with the protruding direction thereof perpendicular to the insertion direction of the light-filtering member;
   a fixing member is further provided on the handle portion, and a groove is defined in the mounting side-hole corresponding to the fixing member; after the light-filtering member is inserted into the body, the fixing member is clamped into the groove.

6. The hair-removal apparatus according to claim 4, wherein the light-filtering portion comprises a light-filtering sheet and a frame; the frame is connected to the handle portion, and the light-filtering sheet is disposed in the frame;
   an interspace is defined between the light-filtering sheet and the handle portion; at least one protrusion is provided at one end of the handle portion close to the interspace, and the protrusion abuts against the light-filtering sheet.

7. The hair-removal apparatus according to claim 4, wherein the light-filtering portion is parallel to the front glass sheet.

8. The hair-removal apparatus according to claim 7, wherein a hollow separating member is disposed in the main body, which seals the region between the light-transmitting crystal and the front glass sheet.

9. The hair-removal apparatus according to claim 8, wherein one end of the partition plate corresponding to the mounting side-hole defines an opening, and the other end thereof away from the opening defines a step;
   during insertion of the light-filtering member into the body, the light-filtering portion enters through the opening and eventually abuts against the step.

10. The hair-removal apparatus according to claim 4, wherein the main body is provided with two Hall elements; the handle portion defines a first position and a second position corresponding to the two Hall elements; the sensing element is disposed at the first position, or at the second position, or at both the first position and the second position.

11. The hair-removal apparatus according to claim 4, wherein the handle portion is provided with an anti-reverse insertion structure, and the shape of the mounting side-hole, matches the shape of the handle portion.

12. The hair-removal apparatus according to claim 3, wherein the main body comprises a circuit board used for connecting external devices, a key circuit board and a main-control circuit board, and the key circuit board and the light-emitting mechanism are respectively arranged on two sides of the main-control circuit board;
 a gap is defined between the main-control circuit board and the body;
the circuit board used for connecting external devices comprises a connecting section and a conducting section that are electrically connected; at least part of the conducting section is positioned in the gap, and the connecting section is electrically connected to the key circuit board.

13. The hair-removal apparatus according to claim 12, wherein the circuit board used for connecting external devices is entirely or partially made from a flexible circuit board material;
 the main body further comprises a thermosensitive assembly, which penetrates through the light-emitting mechanism and closely disposed on the light-transmitting crystal; the conducting section is closely disposed to the body so that the conducting section is connected to the thermosensitive assembly.

14. The hair-removal apparatus according to claim 13, wherein the connecting section is bent toward the main-control circuit board and defines a first notch, and part of electronic components on the main-control circuit board are accommodated in first notch;
 the conducting section is bent toward the light-transmitting crystal and defines a second notch, and the light-transmitting crystal wrapped by the body is clamped in the second notch; the body defines a refrigerating-sheet assembling hole and a temperature-measuring hole; the main body further comprises a refrigerating assembly in contact with the light-transmitting crystal through the refrigerating-sheet assembling hole to refrigerate the light-transmitting crystal;
 one end of the thermosensitive assembly penetrates into the temperature-measuring hole and is in contact with the light-transmitting crystal.

15. The hair-removal apparatus according to claim 12, wherein a second thermistor is provided on the key circuit board, and the main body further comprises a heat-dissipating mechanism;
 the second thermistor penetrates into the heat-dissipating mechanism to detect the temperature inside the heat-dissipating mechanism.

16. The hair-removal apparatus according to claim 13, wherein the circuit board used for connecting external devices further comprises a fixing section electrically connected to the conducting section; the Hall element is disposed on and electrically connected to the fixing section;
 the fixing section is parallel to the insertion direction of the light-filtering member.

17. The hair-removal apparatus according to claim 12, wherein the light-emitting mechanism further comprises a pressing plate covered on the conducting section, and a portion of the pressing plate covering the conducting section is positioned in the gap.

\* \* \* \* \*